Feb. 10, 1970     R. T. FREEMAN     3,494,041
MEASURING DEVICE FOR ENGAGING ABRASIVE SURFACES
Filed June 24, 1968
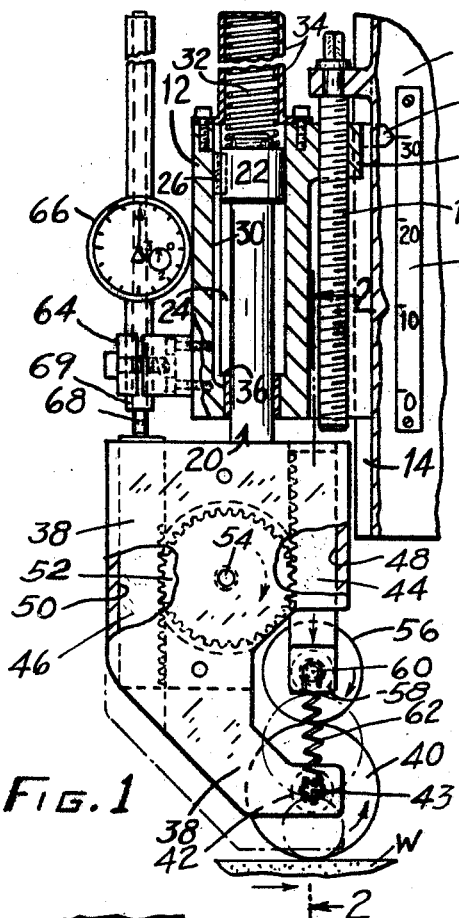
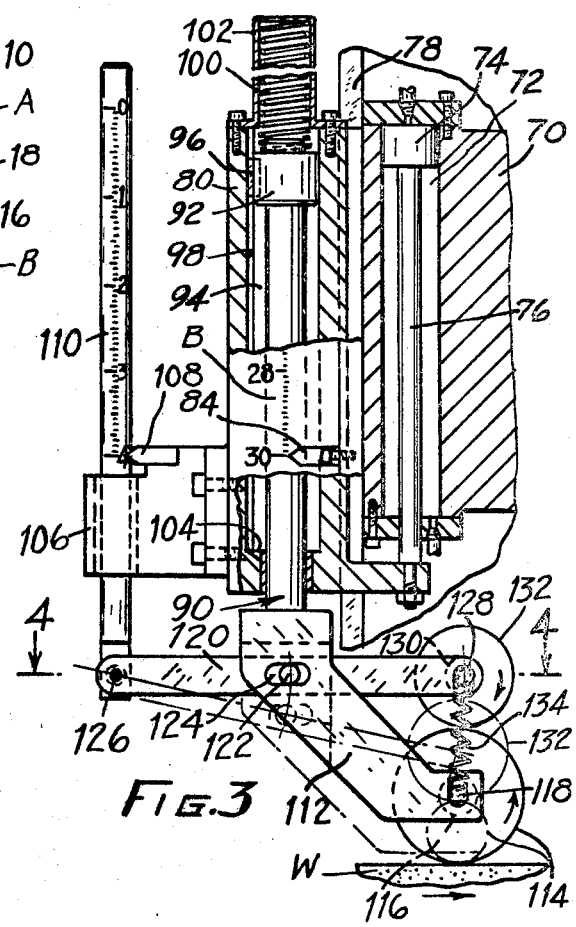
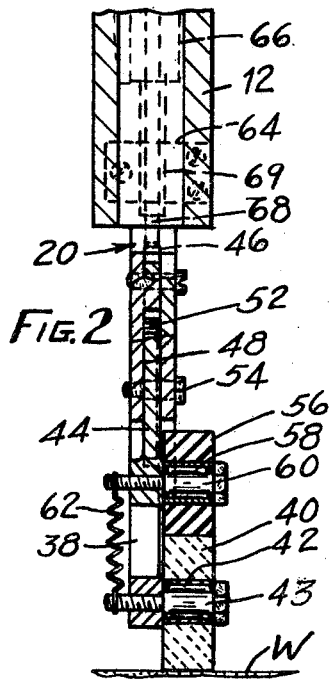
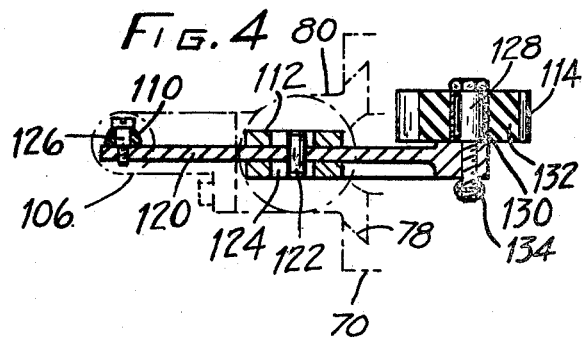
INVENTOR
RAYMOND T. FREEMAN
BY Walter ⸺
AGENT

United States Patent Office 3,494,041
Patented Feb. 10, 1970

3,494,041
MEASURING DEVICE FOR ENGAGING ABRASIVE SURFACES
Raymond T. Freeman, West Boylston, Mass., assignor to Norton Company, Worcester, Mass., a corporation of Massachusetts
Filed June 24, 1968, Ser. No. 739,246
Int. Cl. G01b 3/22
U.S. Cl. 33—172                     8 Claims

ABSTRACT OF THE DISCLOSURE

A gaging device which automatically compensates for wear of the feeler means which engages a moving part such as an abrasive surface. The contact member or feeler means is continuously engaged by a second feeler means to measure the amount of wear on the first feeler, the second feeler means being operative to continuously adjust a suitable compensating means whereby to eliminate the wear factor in the feeler system in order to obtain a continuous accurate reading of the size of the moving part.

BACKGROUND OF THE INVENTION

The field of the invention is gaging and particularly to the art of measuring moving abrasive bodies or workpieces with abrasive surfaces, during manufacture and use thereof.

In the prior art various devices for determining the size of moving abrasive bodies are known which do not have contact with the object to be measured. These non-contact devices sometimes fail to accomplish the gaging function because they usually depend on air or liquid films, which enter the pores of the abrasive body. Other types of non-contact magnetic or different electrical devices which measure proximity differences, require metallic or other particles to be embedded in the abrasive body. Non-contact optical and radiation methods are difficult to keep clean in many situations.

The usual problem encountered heretofore in gaging moving abrasive bodies with contact type devices was the continuous wearing away of the feeler means so that the distance from a reference point to which the gage is calibrated was constantly changing to produce a false indication of the actual dimension of the abrasive body. Applicant has solved this problem by providing a means which automatically compensates for the wear of the contact element and maintains the correct calibration of the size indicator relative to the reference point regardless of the amount of wear of the contact element.

Various contact devices for engaging abrasive bodies are known such as those disclosed in the United States Patents 2,580,717 and 2,641,875. The patents disclose devices which utilize a contact roller, as does the applicant, for engaging the abrasive surface, but the references do not show a means for compensating for wear of the contact roller.

SUMMARY OF THE INVENTION

Briefly, the invention includes a movable carrier mounted on a support and a follower arm for supporting the feeler means, the follower being slidably mounted in the carrier. The follower is biased in one direction toward a reference point to which the indicating means may be calibrated.

The feeler means preferably takes the form of a contact wheel rotatably mounted on the follower arm for rolling contact with the moving abrasive surface the size of which is to be measured. A second roller is mounted either on a slidable gear rack on the follower arm or a pivotal lever carried on the follower arm, the second roller and its support means being biased toward the axis of the contact or feeler roll, for continuous engagement therewith.

A reduction in the radius of the contact or feeler roll in use such as in measuring the size of a moving grinding wheel surface causes the follower arm to move an equal amount. The compensating roll which engages on the feeler roll moves twice the distance of the follower arm. One half of the distance of movement of the compensating roll is caused by the motion of the follower arm moving toward the grinding wheel as the grinding wheel and feeler wheel wear down and the other half of the compensating roll motion comes from the compensating roll's contact with the feeler roll as the latter wears down. The relative motion which takes place between the follower and the compensating roll operates the lever or gear rack to operate a size indicator in a direction to cancel out and thereby compensate for the movement of the follower arm due to wear of the feeler or contact roll by reason of its engagement on the abrasive surface.

It is therefore one object of the invention to provide an accurate measuring device for engaging moving abrasive surfaces.

Another object is to provide an accurate measuring device which compensates for wear of a rotatable contact wheel by abrasive surfaces; and A further object of the invention is to provide a compensating means for measuring devices which automatically and continuously provides an accurate indication of the size of a grinding wheel regardless of wear of a contact or feeler wheel engaging upon the abrasive surface.

DESCRIPTION OF THE DRAWING

FIG. 1 is a view in elevation, partly in section, of the preferred embodiment of the invention;

FIG. 2 is a sectional view taken approximately on line 2—2 of FIG. 1, but with parts broken away to show a portion of the gear and gear housing;

FIG. 3 is a view in elevation, partly in section, of a modified form of the invention; and FIG. 4 is a sectional view taken on approximately line 4—4 of FIG. 3 and showing some of the above supporting structure in phantom lines.

DESCRIPTION OF THE PREFERRED EMBODIMENTS

In FIGS. 1 and 2, there is shown a support 10 on which a carrier or housing 12 is slidably mounted in a guideway 14. A rotatable screw shaft 16 is mounted in a fixed position relative to the support 10 in a suitable bearing support and is threaded into a nut or threaded portion 18 integral with the carrier.

By rotating the screw 16 the carrier 12 and indicator A is caused to move relative to the support 10 and scale B to move the carrier into the desired position. Various other means, such as hydraulic, pneumatic, and lever operated mechanisms may be utilized to move the carrier relative to the support and alternatively the carrier may be fixed thereto or to other types of fixed or movable supports having a convenient basic reference point against which to measure variation in wear of the abrasive surface.

A follower arm or shaft 20 is mounted on the carrier 12 and has an enlarged portion or piston 22 slidable within a bore 24 of the carrier 12. A key 26 is fixed to the piston 22 and engages a keyway 30 in the bore to prevent rotation of the follower arm 20. Means, such as a spring 32, situated within an end cap 34 fixed to the carrier 12 serves to bias the piston on the follower arm toward a shoulder 36 at the bottom of the bore. The shoulder 36 may be used as a secondary reference point from which movements of the follower arm can be measured.

A contact roll or feeler wheel 40 is rotatably mounted on shaft 43 and suitable bearing 42 at the lower end 38 of the follower arm. The contact wheel is preferably made of wear resistant material such as tungsten carbide or other ceramic material for rolling engagement with abrasive surfaces of a body or workpiece W being gaged and may be easily removed and replaced when it becomes worn.

Also, on the lower portion 38 of the follower arm is a wear compensating mechanism which comprises a pair of spaced gear racks 44 and 46 slidable in parallel guideways 48 and 50, that are also arranged to be parallel to the movement of follower arm. The gear racks 44 and 46 mesh with diametrically opposite portions of a gear 52 mounted for rotation about a shaft 54 fixed to the follower arm.

Rotatably mounted on a lower end of the rack 44 is a compensating roll or wheel 56 carried on a shaft 60 fixed to the rack 44. Rack 44 is biased by a spring 62 connected between ends of the shafts 42 and 60 to hold roll 56 in continuous engagement with the contact roll 40. The compensating roll is preferably made of a low cost material such as hard rubber, plastic, or the like, since wear thereof is negligible.

Fixed to the carrier 12 is a clamp bracket 64 in which is held an extra long range dial indicator 66, such as those commercially available from Federal Products Corporation of Providence, R. I. The dial indicator 66 has an operating shaft or operator 68 which is movable within a sleeve 69 and is biased from within the indicator to be in continuous engagement with the upper end of the gear rack 46. Relative movements of the follower arm with respect to carrier 12, including adjustments made by the compensating mechanism (as will be described below), are measured by the dial indicator 66. Operator 68 engages rack 46 which moves with the follower arm, it will be noted, however, when wear reduces the size of the contact wheel 40, the compensating wheel and rack 44 are moved by spring 62. When rack 44 moves downwardly, it rotates gear 52 to move rack 46 upwardly. It is seen that this relative lifting of rack 46 compensates for the extra downward movement of the follower arm caused by the wear of wheel 40 caused by the contact of wheel 40 with the abrasive surface W, the size of which is being measured.

Instead of gage 66, it is apparent that various other types of size indicating means may be employed with this measuring device. For example, an indicator such as that shown in FIG. 3, or an electronic or other remote indicating means could be attached to the system to measure the relative movement between carrier 12 and the output of the compensating means.

The gage operator 68 can be a part of any kind of conventional linear measuring gage such as a pneumatic gage probe, micrometer spindle, transducer, etc. In practical applications, the conventional gage or indicating device controlled by this measuring device could signal the attainment of final size during truing of grinding wheels, so as to retract the truing tool. Also, such retraction could be used to signal and withdraw the measuring device from contact with the abrasive surface to permit removal of the abrasive body.

The measuring device may be used in various ways and for various purposes such as measuring the thickness or diameter of an abrasive grinding wheel being finished to size as by a truing or dressing operation during manufacture thereof. Another purpose may be to determine the diameter of a grinding wheel that is being continually reduced in size during use. Such continuous measurement of the changing diameter of the wheel can be utilized to speed up the drive means accordingly to maintain the desired peripheral speed of the cutting surface.

One method of using the measuring device is to first allow piston 22 of the follower arm 20 to engage the shoulder 36 and if necessary to advance the carrier 12 downwardly to a point where the lowest point of the peripheral surface of the contact wheel coincides with the axis of or with the lower side face of a grinding wheel supported either on a spindle or by a turntable of a truing device. In this position the size indicator can be calibrated, as by usually adjusting the bezel on gage 66 to give a zero reading or reference point from which the follower arm moves away during gaging. Then the measuring device can be operated as by lifting and lowering the support in any well known manner so as to move the contact wheel respectively away and then to position it against the periphery or opposite side face of the abrasive body to determine the diameter or thickness thereof. Alternatively, the follower arm may be moved relative to the carrier or as shown the screw 16 may be rotated by hand or power operated to retract and then advance the follower arm and contact wheel into engagement with the moving abrasive surface.

As the abrasive body is reduced in size, as by truing or wear, the contact wheel 40, follower arm 38, gear 52, racks 44 and 46, compensating wheel 56, and the operator 68 of the size indicator advance as a unit. This unit, however, moves relative to carrier 12 so that the distance feeler 40 moves from its reference point is shown at all times on the indicator.

As briefly explained above, wearing down of the contact wheel 40 is automatically compensated for by upward movement of the rack 46 so that this change in size of the wheel does not show on the indicating means. The compensating mechanism operates continuously to adjust the indicator in a direction which cancels out movement of the follower arm due to a reduction in the size of the contact wheel 40 by the abrasive surface in the following manner.

Assume, for simplicity, that the height of the abrasive surface being measured does not change. In this case, there is no relative movement of the gage operator 68 with respect to the sleeve 69, so the reading on the indicator will not change. The compensating wheel 40 can wear as it is expected, since it is rolling against a moving abrasive surface. As wear decreases the diameter of the contact wheel 40, the follower arm 20 is advanced preferably by the spring 32 or by gravity alone, maintaining wheel 40 in contact with the body W. As the contact wheel 40 wears and becomes smaller, the compensating wheel 56 moves toward the abrasive surface so as to always remain in contact with the contact wheel by action of the spring 62 or by gravity. The compensating wheel 56, the racks 44 and 46, and gear 52 move simultaneously equal amounts in unison with and relative to the follower arm. During the relative movement of the rack 44 downwardly, it rotates the gear to drive the rack 46 upwardly so the indicator 66 continues to give a true reading.

When there is a change in the height of the surface of the work W (assuming no wear of the contact wheel 40 for simplicity), the follower arm 20, gear 52, racks 44 and 46, and the operator 68 will move up or down by the amount of change in the height. The compensation mechanism will not move with respect to the follower arm, and the operator 68 will move in or out of the sleeve 69 in unison with the follower arm, thereby indicating the change in height in the reading of the indicator 66.

It can be seen that in the usual case when wear and changes in height occur the compensating mechanism automatically cancels out movement of the follower arm due to wear of the contact wheel 40 so that the indicating means will always indicate the accurate position of the surface contacted.

A modified form of the measuring device is shown in FIGS. 3 and 4 which discloses a lever operated compensating mechanism, a graduated shaft indicating means, and hydraulic means for positioning the carrier relative to the support.

The modified measuring device comprises a support 70 having a bore 72 in which is slidably mounted a piston 74 integral at one end of a piston rod 76. On the support 70 is a guideway 78 on which is slidably mounted a carrier 80 connected at its lower end to the piston rod 76. By introducing fluid under pressure into one end and exhausting fluid from the opposite end of the bore, the carrier may be advanced to and maintained in the desired position by well known methods and control valves. The carrier may be provided along its side with a primary scale B to indicate the position relative to the work W, and its position relative to the support or a reference point indicated by pointer 84 fixed to the support 70.

A follower arm or shaft 90 has an enlarged portion or piston 92 fixed thereto at its upper end movable within a bore 94. A key 96 is fixed in the piston 92 and engages a keyway 98 in the bore to prevent rotation of the follower arm 90. Although the follower arm 90 can descend under influence of gravity, preferably a spring 100 is provided between the piston and an end cap 102 to positively bias the follower arm and piston toward and into engagement with a shoulder 104 which may be used as a reference or zero point from which measurements can be taken.

On the carrier 80 is an extension or bracket 106 including a pointer 108, and in which is slidably mounted a graduated secondary size indicator rod 110 which is calibrated to read zero when the piston 92 engages the shoulder 104.

A feller or contact roller 114 is rotatably mounted on a lower portion 112 of the follower arm 90. The contact wheel 114 is mounted on a preferably sealed bearing 116 carried on a shoulder screw or shaft 118 fixed to the portion 112 of the follower arm 90.

A compensating mechanism comprising a lever 120 having a centrally disposed pivot pin 122 is supported in a slotted bearing 124 in lower portion 112. The pivot pin 122 extends into, is movable within an elongated slot 124 when the lever is moved when roller 132 carried on bearing 130 and stud 128 at one end of the lever moves in response to a reduction in the size of the contact wheel 114. The other end of the lever 120 is pivotally connected to the size indicator rod or gage operator by a pin 126. The axis of stud 128 supporting the compensating wheel and the pin 126 at the opposite end of lever 120 are substantially the same distance from the axis of the pivot pin 122 of the lever. A spring 134 connected between the axis pins 118 and 128 maintains the compensating wheel 132 in continuous engagement with the contact or feeler wheel 114 which wears down due to its contact with the abrasive surface of the body W being measured.

The operation of the modified form of the measuring device is basically the same as that of the preferred form except that the lever swings about the pin 122 and the compensating wheel moves about an arc instead of a straight line movement of the preferred embodiment. Because the compensating wheel moves about an arc, the measurement made in the modified form of the measuring device is not quite as precise as the measurement obtained by using the more complicated preferred form of the device.

It is obvious that as the contact wheel 114 wears, the compensating wheel 132 moves twice the amount of the movement of the follower arm 112. Since, however, only one-half of the movement of the compensating wheel is relative to the follower arm, such movement causes the left end of the lever 120, as viewed in FIG. 3, to move in a opposite direction an equal amount to in effect maintain the indicator rod in the same relative position with respect to the follower arm 112 except for the slight movement necessary to balance out the wear on wheel 114. The size indicating means 110 and the scale B on the carrier or the support may be graduated in any desired fashion to show the initial size and change in size from the original, with wear of the feeler means automatically compensated.

There has been disclosed hereinabove a useful, precision, and economical device for measuring the size of moving and abrasive bodies, a dimension of which is determined by engageing a feeler on the surface thereof. It is conceivable that other mechanisms which translate rotary motion into linear motion or vice versa might be used in place of the disclosed forms of the compensating mechanism. For example, the gear could be a roll in frictional engagement with plane shafts or bars instead of gear racks, a belt or chain entrained respectively over a pulley or sprocket, or a roll with cams or links mounted at equal distance from the axis of rotation and other equivalent mechanisms can be conceived of which produce equal and opposite motions.

As many possible embodiments may be made of the invention and as many changes might be made in the embodiments set forth above, it is to be understood that all matters hereinbefore set forth or shown in the accompanying drawings are to be interpreted as illustrative.

What is claimed is:

1. A measuring device for engaging an abrasive surface comprising:
   a carrier;
   a follower arm mounted on and movable relative to the carrier;
   a contact wheel rotatably mounted about an axis on the follower arm for engaging the abrasive surface;
   means for indicating relative movement between the carrier and the follower arm for measuring a dimension of the body engaged by the contact wheel; and
   compensating means mounted on the follower arm and positioned between the indicating means and contact wheel that is responsive to changes in the size of the contact wheel, for automatically adjusting the indicating means by an amount equal to changes that might otherwise be present due to the wearing of contact wheel.

2. A measuring device according to claim 1 which further comprises:
   means for biasing the follower arm and contact wheel away from the carrier and toward the abrasive surface; and
   means for maintaining the compensating means in engagement with the contact wheel.

3. A measuring device according to claim 2 wherein the compensating means comprises:
   a gear rotatably mounted on the follower arm;
   a first gear rack, slidably mounted on the follower arm and meshing with a portion of the gear;
   a compensating wheel rotatably mounted about its axis that is supported on one end of the first rack, with said compensating wheel engaging the contact wheel; and
   a second gear rack slidably mounted on the follower arm and meshing with another portion of the gear, said second rack being operatively connected to the indicating means to effect the desired adjustment.

4. A measuring device according to claim 3 wherein the first and second gear racks are mounted to slide in parallel guideways on the follower arm on opposite sides of the gear and the racks move equal amounts relative to the follower arm in opposite directions in response to a change in the size of the contact wheel, said second rack adjusting the indicating means to compensate for wear of the contact wheel.

5. A measuring device according to claim 4 wherein the axis of compensating wheel and of the contact wheel are in the same plane which is disposed parallel to the guideways and the direction of movement of the follower arm, whereby the compensating wheel together with the first rack move twice the amount of movement of the follower arm relative to the abrasive surface in response to a change in radius of the contact wheel.

6. A measuring device according to claim 5 further comprising:
   a support on which the carrier is mounted; and
   means for moving the carrier relative to the support.

7. A measuring device according to claim 2 wherein the compensating means comprises:
   a lever pivotally mounted about its center point on the follower arm intermediate its ends, one end of the lever being adapted to operate the indicating means to provide the automatic adjustment; and
   a compensating wheel rotatably mounted about its axis on the other end of the lever for engaging the contact wheel.

8. A measuring device according to claim 7 wherein the compensating wheel moves on an arc approximately twice the length of movement of the follower arm in response to a change in radius of the contact wheel.

References Cited

UNITED STATES PATENTS 2,115,351   5/1938   Terry et al.
2,224,728   12/1940   Gulliksen.

LEONARD FORMAN, Primary Examiner

C. E. PHILLIPS, Assistant Examiner

U.S. Cl. X.R.

33—147